Patented May 4, 1954

2,677,598

UNITED STATES PATENT OFFICE 2,677,598

OXIDATION OF FERROUS HALIDES TO FORM FERRIC HALIDES

Warren B. Crummett and Vernon A. Stenger, Midland, Mich., assignors to The Dow Chemical Company, Midland, Mich., a corporation of Delaware No Drawing. Application January 19, 1953, Serial No. 332,113

4 Claims. (Cl. 23—87)

The invention concerns an improved method for the oxidation of certain ferrous halides, i. e. ferrous chloride and ferrous bromide, with an oxygen-containing gas, which method permits use of hydrochloric acid or hydrobromic acid to supply the halogen for conversion of the ferrous halide to a ferric halide. It pertains especially to the oxidation of ferrous chloride to ferric chloride.

All of the halides, hydrohalides, and hydrohalic acids hereinafter referred to are ones containing chlorine or bromine as the halogen content thereof.

The reaction of hydrohalic acids with iron results in formation of aqueous ferrous halide solutions and evolution of hydrogen. Such solutions have heretofore been treated with a free halogen, e. g. chlorine or bromine, for purpose of converting the ferrous halide to a ferric halide when the latter was desired.

It is evident that the cost for manufacture of a ferric halide would be reduced if the oxidation could be accomplished directly with air or oxygen and the halogen required for the reaction be supplied by a hydrohalic acid. However, it is known that the oxidation of a ferrous salt with air or oxygen occurs only to a slight extent in an aqueous solution and that the presence of a strong acid, such as hydrochloric acid, further retards the reaction. The failure to obtain more than a minor amount of oxidation of ferrous salts under such conditions has heretofore been attributed to occurrence of the reaction at an extremely slow rate in an aqueous medium.

It is known that the ferric chloride, in an aqueous hydrochloric acid solution containing the same, can be chemically absorbed by a halide salt of a strongly basic anion exchange resin and that it may be displaced therefrom by passage of a dilute aqueous acid solution through a bed of the resin.

It has now been found that when an aqueous hydrohalic acid solution of both a ferric halide and a ferrous halide is treated with a salt, preferably a halide, of a basic anion exchange resin, the ferric halide is selectively, or preferentially, absorbed by chemical reaction with the anion exchange resin leaving the ferrous halide dissolved in the surrounding liquid. It has further been found that by admixing a finely divided halide salt of a basic anion exchange resin with an aqueous solution of a ferrous halide and a hydrohalic acid and passing an oxygen-containing gas such as air or oxygen into the mixture, the ferrous halide is quite rapidly and extensively oxidized to form a ferric halide which is chemically absorbed by the resin as it is formed. From these results, it appears that the oxidation of ferous salts with air or oxygen in an aqueous medium does not occur sluggishly, as heretofore believed, but that the reaction occurs quite rapidly to form a solution containing only a small amount of a ferric halide in equilibrium with a much larger proportion of the unreacted ferrous halide, and that in the process of this invention the equilibrium is upset by removal of the ferric halide from the solution, thus permitting formation of the ferric halide in a substantial yield. However, the invention is not limited by this, or any other, theory as to the reason for the results obtained.

The reactions involved in the process of the invention may be illustrated by the following equations:

(1) $4FeX_2 + O_2 + 4HX \rightleftarrows 4FeX_3 + 2H_2O$ (2) $FeX_3 + yHX \rightleftarrows FeX_3.(HX)_y$ (3) $FeX_3(HX)_y + R \rightleftarrows R.FeX_3.(HX)_y$ (4) $R FeX_3.(HX)_y \xrightleftharpoons{H_2O} R + FeX_3 + yHX$ wherein X represents a halogen such as chlorine or bromine, R represents a halide salt of an anion exchange resin, and y represents an integer. All of these reactions are believed to be of the equilibrium type. In Equation 3 the equilibrium is apparently strongly to the right, i. e. favoring chemical absorption of the ferric halide-hydrogen halide complex by the resin. Reaction 4 proceeds to the right because of removal of the ferric halide from the resin by washing with water or a dilute aqueous hydrohalic acid solution. The liquid used for washing absorbed ferric chloride from the resin usually becomes enriched in a hydrohalic acid during the washing operation. This indicates that the ferric halide absorbed by the resin is at least partially in the form of a ferric halide-hydrohalic acid complex, as illustrated in Equation 2. The limits to the relative proportions of hydrohalic acid and ferric halide which may be combined as such complex have not definitely been established, but it appears that the complex usually contains an average of from 1 to 2 molecular equivalents of a hydrohalic acid per mole of the ferric halide. It will be understood that the above equations are illustrative of reactions which apparently occur in the process, but that they do not necessarily represent the individual reactions that take place.

The acidic aqueous ferrous halide solution which is to be treated in accordance with the invention may be of any desired concentration, e. g. from 1 per cent by weight of a ferric halide up to a saturated ferric halide solution, and it may be a solution of ferrous chloride, ferrous bromide, or both. Solutions containing 10 per cent by weight or more of a ferrous halide, e. g. from 10 to 31 per cent of ferrous chloride, are preferably used. The starting solution may contain, together with the ferrous halide, any of a wide variety of other metal salts, such as sodium chloride, sodium bromide, potassium chloride, potassium bromide, calcium chloride, barium chloride, or aluminum chloride, or minor amounts of sulfates such as sodium sulfate or potassium sulfate, etc., which are not chemically absorbed to an appreciable extent by the anion exchange resin salt and therefore do not interfere in the process. When an impure ferrous halide solution containing such other metal salt is employed in the process of the invention, the ferrous halide is not only oxidized to a ferric halide, but the latter is chemically absorbed by the anion exchange resin leaving the other salt dissolved in the surrounding liquid. The latter may be removed from the resin and the ferric halide thereafter washed from the resin to recover it in a purified condition, i. e. in a form substantially free of salts of the other metal.

The ferrous halide solution used as a starting material should contain, or be treated with, a hydrogen halide in amount such as to form, with the water present, an aqueous hydrohalic acid solution of at least 3-normal, and preferably 5-normal, concentration or higher. It may be of as high an acid concentration as desired. The hydrogen halide can be introduced into the solution prior to, or during, the oxidation reaction. The hydrohalic acid serves not only to provide the halogen required for conversion of the ferrous halide to a ferric halide, but also to facilitate absorption of the ferric halide by the anion exchange resin, apparently by forming a ferric halide-hydrogen halide complex that is absorbed by the resin. In this connection, it may be mentioned that a bed of the resin having the ferric halide-hydrogen halide complex absorbed therein, can be washed with an aqueous hydrohalic acid solution of 3-normal concentration or higher without displacing more than a minor amount of ferric halide from the bed, but that the ferric halide can readily be washed from the bed with a more dilute hydrohalic acid solution, e. g. of 1-normal concentration or lower, or with water.

A halide of any basic anion exchange resin can be used for purpose of chemically absorbing the ferric halide as it is formed in the process. Some of the anion exchange resins known in the art form salts only in neutral or acidic media and, when added in free form, i. e. non-salt form, to an aqueous sodium chloride solution do not render the solution alkaline. Such resins, although capable of forming salts, are not distinctly basic. The basic anion exchange resins which are employed in the process of the invention have a property, when added in their basic form to an aqueous sodium chloride solution, of rendering the solution distinctly alkaline, i. e. of a pH value higher than 8. Anion exchange resins which, when added in basic form and as particles of from 20 to 100 Tyler screen mesh size to 10 times their bed-volume of a 1-normal aqueous sodium chloride solution, bring the solution to a pH value of 10 or higher are preferred.

A number of basic anion exchange resins are known. They contain basic nitrogen groups, such as primary-, secondary-, or tertiary-amine radicals, or quaternary ammonium hydroxide radicals, as the basic anion exchange radicals of the resin molecule. They are insoluble in water and in aqueous solutions of non-oxidizing acids. Examples of such anion exchange resins are the resins obtained by reacting trimethylamine with chloromethylated copolymers of a major proportion by weight of styrene and a minor amount of divinylbenzene; resins obtained by reacting triethylamine with chloromethylated copolymers of a major amount of styrene and minor amounts of ar-ethylvinylbenzene and divinylbenzene; resins obtained by reacting dimethylethanolamine with such chloromethylated copolymers; and resins obtained by reacting diethylenetriamine with such chloromethylated copolymers; etc.

Any oxygen-containing gas that is substantially free of reactive reducing agents can be used in the process. Air, or oxygen, is usually employed.

As hereinbefore indicated, the process involves a step of oxidizing a ferrous halide by treating an aqueous solution of the same and a hydrohalic acid, e. g. hydrochloric acid or hydrobromic acid, with an oxygen-containing gas while the solution is in contact with a halide of a basic anion exchange resin, whereby ferrous halide is oxidized to form a ferric halide that is chemically absorbed by the resin, and thereafter washing the absorbed ferric halide from the resin. Either, or both, of these steps can be carried out batchwise or in a continuous manner.

In carrying the oxidation out batchwise, an oxygen-containing gas such as air or oxygen is passed into a mixture of a salt, preferably a halide or a hydrohalide, of a basic anion exchange resin in finely divided form and an acidic aqueous solution of ferrous chloride, ferrous bromide, or both, and hydrochloric acid, hydrobromic acid, or both. The anion exchange resin salt, the ferrous halide, and the hydrohalic acid preferably all contain a single kind of halogen atoms, but this is not necessary. For instance, hydrobromic acid can be used in such solution to supply bromine for the oxidation of ferrous chloride to a ferric halide, or the starting solution may comprise ferrous bromide and hydrochloric acid. Usually a solution of ferrous chloride and hydrochloric acid is employed. The salt of the anion exchange resin can be used in any proportion, but is usually employed in amount at least as great as that theoretically required to chemically absorb 10 per cent by weight of the iron salt as a ferric halide, assuming that one molecular equivalent of ferric halide is absorbed by each ion exchange radical in a molecular equivalent of the resin. In practice, the anion exchange resin is preferably used in amount exceeding that theoretically required to absorb all of the iron as a ferric halide. The resin is usually in the form of particles or granules of 50 Tyler screen mesh size or smaller, e. g. of from 50 to 250 mesh size, but it may be in the form of larger granules. Under otherwise similar conditions, the oxidation reaction occurs more rapidly with decrease in the average particle size of the resin.

The oxygen-containing gas is advantageously fed to the mixture through a sparger so as to form a large number of small gas bubbles dispersed throughout the mixture, but it can be introduced in other ways, e. g. through an ordinary tube while stirring the mixture to disperse the gas in the same.

The reaction is carried out in liquid phase and usually at approximately atmospheric pressure and at room temperature or thereabout. However, it can be accomplished at lower or higher temperatures and pressures, e. g. at temperatures ranging from about 10° C. to 100° C. or higher and at pressure of from 0.5 to 10 atmospheres or above. An increase in temperature causes an increased rate of reaction, but the use of temperatures considerably higher than 100° C., e. g. as high as 150° C. or above, may cause decomposition or other damage to the anion exchange resin.

The extent to which the oxidation occurs is dependent on a combination of factors such as the proportion of oxygen fed to the mixture, the concentration of hydrohalic acid present, and the proportion of resin employed. However, the reaction decreases in rate as it is continued using a single batch of anion exchange resin and is usually terminated when from 10 to 50 per cent of the iron salt initially present in the solution has been removed by being oxidized and absorbed by the resin.

In the batchwise mode of operation the liquor is then separated from the resin, e. g. by filtering, decanting, or centrifuging. The liquor usually retains a considerable amount of ferrous halide and can be enriched in the latter, e. g. by reaction with iron, and again be subjected to the oxidation reaction to form a further amount of a ferric halide.

The ferric halide product is recovered from the anion exchange resin by washing the latter with an aqueous liquid such as water, or preferably a dilute aqueous hydrohalic acid solution, e. g. of less than 3-, and preferably from 0.02- to 1-, normal concentration. The washing is usually accomplished by passing a dilute aqueous hydrohalic acid solution through a bed of the resin having a ferric halide absorbed therein until a fraction of effluent liquor containing ferric halide has been collected and the wash liquor flowing from the bed is substantially free of ferric halide. After completion of the washing operation, the anion exchange resin is in the form of a halide, or a hydrohalide, salt thereof suitable for re-employment in the reaction for the oxidation of a further amount of a ferrous halide.

The ferric halide solution which is obtained by the above washing operation usually contains a considerable amount of a hydrohalic acid. The ferric halide solution can be heated to distil the hydrohalic acid therefrom and concentrate the ferric halide in the residual liquor. If desired, the distillation can be continued to dryness, or to a point at which the ferric halide can be crystallized from the still residue. The hydrohalic acid that is recovered in the distillation can be re-employed in the process.

Instead of operating in the above-described batchwise manner, the process can be practiced continuously by circulating the halide salt of the anion exchange resin through one or more reaction zones counter to flows of an oxygen-containing gas and an aqueous solution of a ferrous halide and a hydrohalic acid through such zones; then passing the anion exchange material through a washing zone, where it is contacted with a flow of water or a dilute hydrohalic acid solution which washes the absorbed ferric halide product from the anion exchange resin; collecting the effluent ferric halide solution; and returning the washed anion exchange resin to the reaction zone, or zones. In operating in such continuous manner, the finely divided anion exchange resin is preferably passed successively downward through each of a series of reaction towers counter to an up-flow of air or oxygen and the acidic ferrous halide solution through each tower, and the ferrous halide solution is advantageously passed through the series of towers in a direction opposite to the movement of ion exchange material through the towers. By operating in this manner, the anion exchange resin is brought into contact with a ferrous halide solution of increasing concentration as it becomes spent due to chemical absorption of the ferric halide formed by the oxidation and the ferrous halide solution becomes contacted with fresher, i. e. less exhausted, anion exchange resin as the concentration of ferrous halide in the solution decreases due to the oxidation reaction. As a result, the oxidation occurs more rapidly and extensively than when carried out batchwise. The operation of washing absorbed ferric halide from the resin can be carried out by passing the anion exchange resin downward through a tower counter to an upward flow of a dilute aqueous hydrohalic acid solution through and from the tower, or by passing the acid solution through a fixed bed of the anion exchange resin having the ferric halide absorbed therein. The acidic ferric halide solution obtained by either such washing operation may be concentrated by evaporation and the ferric halide be crystallized therefrom.

The following examples describe a number of ways in which the invention has been practiced and illustrate certain of its advantages, but are not to be construed as limiting its scope.

EXAMPLE 1

To 100 ml. of an aqueous ferrous chloride solution of 31 weight per cent concentration there was added 150 ml. of an aqueous hydrochloric acid solution of approximately 36 per cent concentration. Approximately 165 ml. of a finely divided anion exchange resin in the form of its chloride salt was added to the resulting solution. The anion exchange resin was one formed by reacting trimethylamine with a chloromethylated copolymer of about 92 per cent by weight styrene, 4 per cent ar-ethylvinylbenzene and 4 per cent divinylbenzene. It was in the form of small substantially spherical beads of from 50 to 100 mesh size according to the Tyler screen scale. A stream of air was fed into the mixture near the bottom of the latter for 3 hours, during which time the mixture was at approximately room temperature. The air was introduced through a porous glass cup so as to form a large number of small bubbles in the mixture. After feeding air to the mixture for the time just stated, the mixture was filtered and the ion exchange material was rinsed with aqueous hydrochloric acid of approximately 18 per cent concentration. The rinse was added to the filtrate after which an aliquot portion of the latter was analyzed for iron compounds. The liquor was found to retain only 62 per cent as much ferrous chloride as when initially employed, indicating that the remaining 38 per cent, had been oxidized and absorbed by the anion exchange resin. A 0.05 normal aqueous hydrochloric acid solution was passed through a bed of the resin and the effluent liquor was collected in fractions. The early fractions were an aqueous hydrochloric acid solution containing small amounts of an iron salt, presumably ferric chloride. As a subsequent fraction there was obtained 97.7 grams of aqueous liquor containing 12.5 per cent by weight of ferric chloride and 6.2 per cent of hydrochloric acid.

EXAMPLE 2

This example demonstrates that the anion exchange resin salts formed by reaction of aqueous hydrochloric acid with each of a number of basic anion exchange resins were effective in promoting the oxidation of ferrous chloride to form ferric chloride by the method of the invention. The anion exchange resins which were employed in the respective experiments of this example are Dowex-1, a strongly basic anion exchange resin which in its basic form contains quaternary ammonium hydroxide radicals as the ion exchange radicals of the molecule; Amberlite–IRA–410, a somewhat less strongly basic anion exchange resin which also contains quaternary ammonium hydroxide radicals when in its basic form; Dowex-3, an even less strongly basic anion exchange resin containing secondary amine radicals; and DeAcidite, a phenolic anion exchange resin containing amine groups as the anion exchange radicals. Each of said resins is sufficiently basic so that when added, in its finely divided basic form to 10 times its bulk-volume of 1-normal aqueous sodium chloride solution, it brings the liquid to a pH value of 10 or higher. Each resin was preconditioned for use in the process by passing an approximately 18 per cent by weight hydrochloric acid solution through a bed of the same until the liquid flowing from the bed was strongly acidic. This treatment converted each resin to a salt, i. e. a chloride or hydrochloride, of the same. The starting solution that was subjected to oxidation in each experiment consisted of a mixture of 100 ml. of an aqueous ferrous chloride solution of 30 weight per cent concentration and 100 ml. of aqueous hydrochloric acid of 36 per cent concentration. In one experiment, air was fed as fine bubbles into such acidic ferrous chloride solution while the latter was at approximately room temperature. No ion exchange material was in contact with the solution during the introduction of air thereto. After feeding air to the solution at a steady rate for 3 hours, the flow of air was discontinued and a portion of the solution was analyzed for ferrous and ferric chlorides. It was found that between 5 and 5.5 per cent of the ferrous chloride had been oxidized to ferric chloride. The results obtained in this experiment without use of an ion exchange resin served as a basis for comparison with the other experiment in which anion exchange resins were employed. In each of the other experiments, an acidic ferrous chloride solution, similar in kind and amount to that employed in the above experiment, was treated with 120 ml. of one of the aforementioned anion exchange resins in the form of the chloride or hydrochloride salt thereof. Air was fed to the resulting mixture at the same rate as in the above-described experiment for 3 hours while the mixture was at room temperature. The proportion of the ferrous chloride starting material that had been oxidized to ferric chloride and chemically absorbed by the resin was then determined by analyzing a portion of the reaction liquor. The following table names the anion exchange resin employed in each experiment, gives the range of mesh sizes of the resin granules according to the Tyler screen scale, and gives the per cent of the ferrous chloride starting material that was oxidized to ferric chloride in each experiment.

*Table I*

| Run No. | Anion Exchange Resin | | Percent of FeCl₂ Oxidized |
|---|---|---|---|
| | Kind | Mesh Size | |
| 1 | Dowex-1 | 50–100 | 24.3 |
| 2 | Amberlite-IRA-400 | 20–50 | 22.2 |
| 3 | Dowex-3 | 50–100 | 13.9 |
| 4 | DeAcidite | 20–50 | 15.1 |

EXAMPLE 3

In each of two experiments, an acidic aqueous solution of ferrous chloride was prepared by admixing 100 ml. of an aqueous ferrous chloride solution of 30 weight per cent concentration with 100 ml. of an aqueous hydrochloric acid solution of 36 per cent concentration. To the resulting solution there was added 165 ml. of a chloride salt of an anion exchange resin in the form of granules of from 50 to 100 mesh size. The anion exchange resin used in one of the experiments was the chloride salt of Dowex-1, a strongly basic anion exchange resin which in its basic form contains quaternary ammonium hydroxide radicals. The anion exchange resin used in the other experiment was a chloride salt of Dowex-2, a less strongly basic anion exchange resin which in its basic form also contains quaternary ammonium hydroxide radicals. Table II indicates which of these resins was used in each experiment. Into each mixture of the resin and the acidic ferrous chloride solution, air was passed at a steady rate for 3 hours while the mixture was at room temperature. The per cent of the ferrous chloride that had been oxidized to ferric chloride and chemically absorbed by the resin was then determined by analyzing a portion of the reaction liquor and is given in Table II.

*Table II*

| Run No. | Resin | Percent of FeCl₂ Oxidized |
|---|---|---|
| 1 | Dowex-1 | 33.3 |
| 2 | Dowex-2 | 37.7 |

EXAMPLE 4

In each of a series of experiments, air was passed for 3 hours into a solution consisting of a mixture of 100 ml. of an aqueous ferrous chloride solution of 30 weight per cent concentration and 100 ml. of aqueous hydrochloric acid of 36 per cent concentration. The rate and mode of introducing the air was the same in all of the experiments. After the passage of air into each such solution, the latter was analyzed to determine the proportion of the ferrous chloride initially present that had been oxidized to form ferric chloride. One of the experiments was carried out without addition of an anion exchange agent to the acidic ferrous chloride starting solution. In each of the other experiments, a chloride of an anion exchange resin, of the kind employed in Example 1, was added to the acidic ferrous chloride solution and was present during the passage of air into the solution. The experiments differed from one another as to the proportion of anion exchange resin in the reaction mixture. Table III gives the milliliters of anion exchange resin employed in each experiment and the per cent of the ferrous chloride initially present which was oxidized to ferric chloride during the air-blowing operation.

Table III

| Run No. | ml. of Resin | Percent of FeCl₂ Oxidized |
|---|---|---|
| 1 | 0 | 7 |
| 2 | 5 | 7.5 |
| 3 | 10 | 8 |
| 4 | 20 | 12.4 |
| 5 | 60 | 20.3 |
| 6 | 120 | 21.7 |

EXAMPLE 5

The anion exchange resin employed in this example was a bromide of a resin otherwise similar to that used in Example 1. To a solution consisting of a mixture of 100 ml. of an aqueous ferrous chloride solution of 30 per cent concentration and 100 ml. of aqueous hydrobromic acid of 48 per cent concentration, there was added 100 ml. of the finely divided anion exchange resin in the form of its bromide salt. Air was passed into the mixture for 3 hours while the mixture was at approximately room temperature. A portion of the reaction liquor was then withdrawn and analyzed for ferrous salts. It was found that 16.8 per cent of the ferrous chloride initially present in the solution had been oxidized to form one or more ferric halides, presumably ferric dichlorobromide, $FeCl_2Br$, and that the ferric halide had been chemically absorbed by the anion exchange resin.

EXAMPLE 6

In each of several experiments, a solution, consisting of a mixture of 100 ml. of an aqueous ferrous chloride solution of 31 per cent concentration and the volume of aqueous hydrochloric acid of 36 per cent concentration which is stated in the following table, was admixed with 165 ml. of a chloride of an anion exchange resin similar to that employed in Example 1. Air was passed into the mixture, which was at room temperature, for 3 hours. A portion of the reaction liquor was then analyzed to determine the proportion of the ferrous chloride, initially present in the solution, that had been oxidized to ferric chloride which was chemically absorbed by the resin. Table IV gives the milliliters of 36 per cent hydrochloric acid used in preparing each starting solution and the per cent of the ferrous chloride initially present that was oxidized to ferric chloride.

Table IV

| Run No. | ml. of HCl Sol'n | Percent of FeCl₂ Oxidized |
|---|---|---|
| 1 | 50 | 13.4 |
| 2 | 75 | 18.9 |
| 3 | 100 | 37.2 |
| 4 | 125 | 34.8 |
| 5 | 150 | 33.3 |

In run 3, which occurred most favorably, the acidic ferrous chloride starting solution contained water and hydrogen chloride in proportions corresponding to an aqueous hydrochloric acid solution of about 6-normal concentration.

We claim:

1. A method which comprises passing an oxygen-containing gas into a mixture of a finely divided salt of a basic anion exchange resin and a liquid aqueous solution of at least one ferrous halide of the group consisting of ferrous chloride and ferrous bromide and at least one hydrogen halide of the group consisting of hydrogen chloride and hydrogen bromide, the hydrogen halide and water being present in proportions corresponding to an at least 3-normal aqueous hydrohalic acid solution, whereby ferrous halide is oxidized to form a ferric halide that is chemically absorbed by the anion exchange resin.

2. A method as described in claim 1, wherein the anion exchange resin salt is a salt of the basic resin and hydrochloric acid, the ferrous halide is ferrous chloride, the hydrohalic acid is hydrochloric acid, and the ferric halide that is formed is ferric chloride.

3. A method which comprises passing an oxygen-containing gas into a mixture of: (a) an anion exchange resin salt of the kind formed by reaction of a basic anion exchange resin with a hydrohalic acid of the class consisting of hydrochloric acid and hydrobromic acid, and (b) an aqueous solution of (1) at least one ferrous halide of the group consisting of ferrous chloride and ferrous bromide and (2) at least one hydrohalic acid of the class consisting of hydrochloric acid and hydrobromic acid, which solution is of at least 3-normal concentration with respect to the aqueous hydrohalic acid contained therein, whereby ferrous halide is oxidized to form a ferric halide that is chemically absorbed by the resin, thereafter separating the resin from the liquor, and extracting the ferric halide from the resin by washing the latter with a liquid of the class consisting of water, dilute hydrochloric acid, and dilute hydrobromic acid.

4. A method, as claimed in claim 3, wherein the anion exchange resin salt is of a kind resulting from reaction of a basic anion exchange resin with hydrochloric acid, the ferrous halide is ferrous chloride, the hydrohalic acid starting material is hydrochloric acid, the ferric halide which is formed is ferric chloride, and the latter is extracted from the resin with a dilute aqueous hydrochloric acid solution.

No references cited.